Sept. 21, 1965  J. R. A. POLLOCK  3,207,605
PRODUCTION OF BEER
Filed Nov. 13, 1961
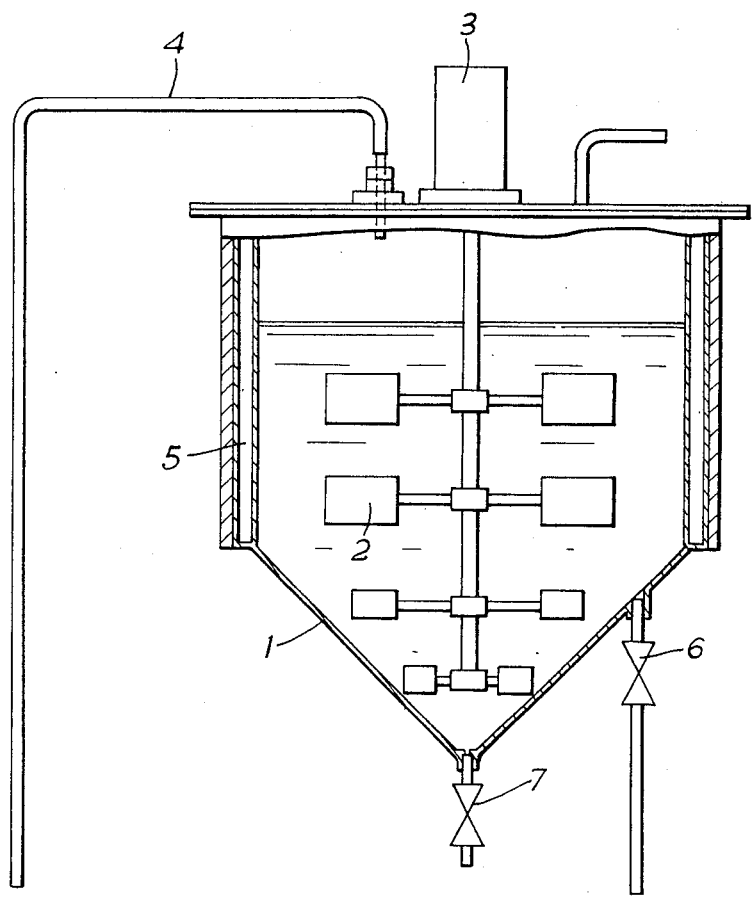
James R. A. Pollock,
INVENTOR
BY Wenderoth, Lind
and Ponack,
ATTORNEYS

United States Patent Office 3,207,605
Patented Sept. 21, 1965

---

3,207,605
PRODUCTION OF BEER
James R. A. Pollock, Dublin, Ireland, assignor to Brewing Patents Limited, London, England, a British company
Filed Nov. 13, 1961, Ser. No. 151,748
Claims priority, application Great Britain, Nov. 14, 1960, 38,968/60
3 Claims. (Cl. 99—31)

The present invention relates to the production of potable beers and in particular to a process for the fermentation of wort in a semi-continuous manner which results in fermented wort becoming available in batches for further processing.

Processes for the continuous fermentation of wort are known and these processes are capable of producing beer at a very high rate as compared with conventional processes in which batches of wort are fermented with yeast in fermentation vats. Continuous fermentation processes have the disadvantage that they must be continued in operation over weekends and holidays, if the maximum economic advantage is to be obtained from them, and this in turn means that extra storage capacity must be installed in the brewery to hold the excess beer that may build up at such periods.

It is an object of the present invention to provide a brewing process which can readily be shut down when further supplies of fermented wort are not required, but which can at the same time produce beer at a rate comparable to that of known continuous processes.

It is already well-known that agitation of a fermentation medium speeds up the rate of fermentation and agitation has been applied both in continuous and batch processes for the production of beer. In the production of beer by batch fermentation, agitation of the fermenting wort is either not employed at all or is only carried out at particular intervals when the degree of agitation is not great. In continuous processes, on the other hand, more intense agitation is generally employed so as to maintain substantially equal conditions of yeast dispersion and composition throughout the wort in each fermentation vessel.

The present invention provides a process for the production of beer which comprises adding unfermented wort to a body of yeast and either wort or fermented wort, which is subjected to sufficient agitation to maintain the yeast evenly dispersed through the wort, the unfermented wort being added at such rate either continuously or in separate small quantities that at the end of a predetermined time the body of fermenting wort is fermented to a desired degree of attenuation, at least a major part of the fermented wort then being separated from the yeast. Preferably the process is carried out under conditions such that the fermentation stage is completed in about 16 hours, so that a batch of beer may be produced each working day.

It is preferred to operate the process by discontinuing the agitation at the end of the fermentation period and then holding the fermented wort in the fermentation vessel for sufficient time to permit a proportion of the yeast to settle to the bottom of the vessel to form a layer of yeast, containing fermented wort, all the material above a predetermined level then being run off so as to leave in the bottom of the vessel substantially the same amount of yeast and fermented wort as were present at the beginning. In this way the amount of yeast produced during the fermentation is run off with the beer and is separated therefrom in a separate stage before further processing of the beer.

Since in all processes for the production of beer it is desired to grow as little yeast as possible, the process is preferably carried out in an enclosed vessel under substantially anaerobic conditions and to enable such conditions to be maintained, nitrogen or carbon dioxide is fed into the top of the vessel as the fermented wort and yeast are withdrawn from the bottom of the vessel at the end of the process. It is, however, found desirable to permit very small quantities of air to enter the system during fermentation, so as to maintain the yeast in an active condition for repeated use in a number of successive brewing cycles.

In a preferred operation the initial medium was a slurry of yeast in beer, the concentration of yeast being above 25 grams of yeast (dry weight) per litre, the usual range being 25–300 grams of yeast (dry weight) per litre. During the process a volume of wort 25–100 times the initial volume may be added in preferred operation, the rate of addition being so adjusted in relation to all the conditions affecting the fermentation that at the completion of the addition, the wort in the fermentation vessel has reached the desired degree of attenuation.

It will be appreciated that rate of fermentation will be controlled by such factors as the variety and initial quantity of yeast, temperature and degree of agitation of the fermentation medium. It is preferred to carry out the process with a flocculent variety of yeast, since such yeast will separate more rapidly from the fermented wort when agitation is stopped at the end of the production of a batch of fermented wort. For convenience of operation, it is also preferred to pump in the unfermented wort at a steady rate, which will be determined empirically for the process conditions which it is desired to employ. Although the process can be carried out at relatively high temperatures, such as 20–25° C., it may be desired to carry out the fermentation at lower temperatures to produce beer having certain characteristic qualities and flavours.

The preferred initial amount of yeast is such that the concentration of yeast in the wort when final volume is reached is still high enough to promote rapid fermentation of the wort and at the same time to inhibit rapid yeast growth. It is, of course, well-known that the rate of yeast growth decreases with increased concentration of yeast in the wort.

It is, however, possible to start the process up with a relatively small quantity of yeast and to permit the yeast to build up in the fermentation vessel during the course of a small number of brewing cycles until the amount of yeast carried over in the wort at the end of the cycle approximates the amount of yeast grown in the cycle, whereafter the process is carried out according to the preferred procedure indicated above.

Example

A typical brewers' yeast, a flocculent strain of *Saccharomyces cerevisiae*, identified as No. 1026 at the National Collection of Yeast Cultures, Nutfield, Surrey, England (150 grams dry weight) suspended in about 1 litre of fermented wort was agitated in a large enclosed vessel. Wort of a specific gravity of 1.040 was then pumped in at a steady speed until the volume had reached 70 litres. This volume was attained after 16 hours. The temperature was maintained substantially constant at 20° C. The specific gravity of the wort was found to be 1.010, corresponding to a desired attenuation of the original wort.

The stirring was interrupted and the yeast was allowed to settle out. After settlement the supernatant fermented wort and yeast were run off so as to leave still the original volume of fermented wort and yeast in the fermentation vessel, which ensured that an appropriate quantity of yeast was left in the fermentation vessel for the next brewing cycle.

The batch of fermented wort run off from the fermentation vessel was then separated from the yeast carried out of the fermentation vessel with it. This yeast represents approximately the amount of yeast grown in the process. The processing of filtered fermented wort was then finished in a generally conventional manner.

Suitable apparatus for carrying out the process is indicated in the accompanying diagrammatic drawing.

In the drawing there is shown a vertical enclosed fermentation vessel 1, provided with a multi-bladed agitator 2, which is driven, for example, by a motor 3 having an associated reduction gearing. The vessel 1 is provided with a fresh wort inlet line 4, having an associated pump (not shown) and a water jacket 5, through which heating or cooling water may be passed.

At the end of a brewing cycle, the fermented wort is run off through a tap 6, whilst a further tap 7 is provided to permit the whole contents of the vessel to be discharged when it is desired to clean it out. The volume of the vessel 1 below the tap 6 is the volume required for the seed yeast and wort for the next brewing cycle. A series of taps 6 at different levels may be provided, if desired. The vessel is also provided with a gas vent pipe 8, through which evolved carbon dioxide is led away to a gas holder.

I claim:

1. A process for the production of beer comprising agitating an initial volume of liquor and yeast under substantially anaerobic conditions and under controlled temperature conditions with the initial concentration of yeast being in the range of 25–300 grams yeast (dry weight) per litre of liquor, steadily increasing the volume of liquor by the addition of unfermented wort until the volume of liquor is 25–100 times its original volume, the unfermented wort being added at such a rate that at the end of a predetermined time the liquor is fermented to a desired degree of attenuation, and then separating at least a major part of the fermented wort from the yeast.

2. A process for the production of beer as claimed in claim 1, in which the step of separating comprises stopping the agitation at the end of the predetermined time, holding the liquor to permit at least part of the yeast to settle to form a yeast-rich layer, and running off the supernatant layer of fermented wort.

3. A process for the production of beer as claimed in claim 2, wherein the liquor is held for such time as to permit the yeast concentration in the yeast-rich layer to attain the same value as the initial yeast concentration, and an amount of the supernatant liquid is run off to leave a volume of liquor equal in volume to and having the same yeast concentration as in the initial volume, whereby the amount of yeast grown in the process is carried away in the supernatant liquid run off.

References Cited by the Examiner
UNITED STATES PATENTS

| | | | |
|---|---|---|---|
| 2,188,192 | 1/40 | Scholler et al. | 195—94 |
| 3,078,166 | 2/63 | Hough et al. | 99—43 |

A. LOUIS MONACELL, *Primary Examiner.*

TOBIAS E. LEVOW, *Examiner.*